3,708,539
CONDENSATION OF AMMONIA OR A PRIMARY OR SECONDARY AMINE WITH AN ALCOHOL
Donald M. Fenton, Anaheim, Calif., assignor to Union Oil Company of California, Los Angeles, Calif.
No Drawing. Filed Feb. 6, 1970, Ser. No. 9,404
Int. Cl. C07c 85/02
U.S. Cl. 260—585 B
9 Claims

ABSTRACT OF THE DISCLOSURE

Ammonia or a primary or secondary amine is condensed with an alcohol in a liquid reaction medium containing a ruthenium, osmium, rhenium or technetium catalyst which is preferably in complex association with a biphyllic ligand. A typical process comprises contacting dibutylamine with butanol in the presence of ruthenium trichloride and triphenylphosphine to produce tributylamine.

DESCRIPTION OF THE INVENTION

The invention relates to the preparation of an amine by condensing ammonia or a primary or secondary amine with an alcohol. More particularly, the invention relates to a novel catalyst for the above condensation reaction.

It is known that ammonia or a primary or secondary amine may be condensed with an alcohol to produce a primary, secondary or tertiary amine, respectively, and water. The reaction, however, requires high temperatures to maintain a suitable conversion. Hence, a discovery of a catalyst which will provide a suitable conversion at relatively low temperatures is desirable.

It is an object of the invention to prepare a primary, secondary or tertiary amine from ammonia or a primary or secondary amine, respectively.

It is another object of the invention to form the above amines by condensing ammonia or a primary or secondary amine with an alcohol.

It is a further and more specific object of the invention to provide an effective catalyst for the reaction.

The reaction of the invention proceeds as follows:

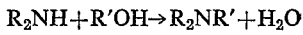

The nitrogen-containing reactant of the invention may be ammonia, or a primary or secondary amine having 1 to 20 carbons, preferably 1 to 15 carbons and having the following structural formula:

wherein R is hydrogen or the same or different alkyl, cycloalkyl or monocyclic aromatic hydrocarbon group such as alkyl, cycloalkyl or aryl. Preferably R is alkyl, and, most preferably, alkly having 1 to 10 carbons.

As used hereinabove, alkyl, cycloalkyl and aryl groups are those hydrocarbon groups wherein the nitrogen is bonded, respectively, to an alkyl, cycloalkyl or aryl carbon thus including such groups as aralkyl, alkylcycloalkyl, alkaryl, etc., as well as purely alkyl, cycloalkyl and aryl groups. Examples of suitable R groups are, therefore, methyl, ethyl, propyl, 2-ethylhexyl, octyl, isooctyl, decyl, octadecyl, 3-phenylbutyl, cyclobutyl, methylcyclopentyl, cyclohexyl, cyclooctyl, diethylcyclohexyl, phenyl, benzyl, tolyl, xylyl, duryl, p-amylphenyl, 3,5-dihexylphenyl, etc.

Examples of suitable amines are methylamine, ethylamine, propylamine, butylamine, 2-ethylhexylamine, octylamine, tetradecylamine, eicosanylamine, aniline, toluidine, xylidine, p-amylphenylamine, cyclohexylamine, 3-phenyloctylamine, 4 -cyclooctyldecyclamine, 2 - tolylnonylamine, dimethylamine, dipropylamine, dipentylamine, ditetradecylamine, diphenylamine, dicyclohexylamine, dicyclononylamine, phenylcyclohexylamine, tolylhexylamine, 3-phenylhexylmethylamine, etc. Examples of the preferred alkyl amines are butylamines, pentylamine, octylamine, dimethylamine, dipropylamine, octyldodecylamine, etc.

The reactant alcohol of the invention has 1 to 20 carbons, preferably 1 to 15 carbons and has the following general structure:

ROH wherein R is a saturated hydrocarbon group such as alkyl or cycloalkyl. Preferably R is alkyl.

As used hereinabove, alkyl and cycloalkyl are defined as groups wherein the oxygen is bonded, respectively, to an alkyl or cycloalkyl carbon and, therefore, include groups such as aralkyl, cycloalkylalkyl, alkylcycloalkyl, etc., as well as purely alkyl and cycloalky groups.

Examples of suitable alcohols include methanol, ethanol, propanol, butanol, heptanol, tetradecanol, eicosanol, cyclohexanol, cyclononanol, 3-cyclohexyloctanol, 3-cyclohexyl-4-methyldodecanol, 2-phenylethanol, 3 - phenyloctanol, 4 - tolyl-6-methyldodecanol, etc. Examples of the preferred alkanols are ethanol, propanol, butanol, octanol, etc.

The catalyst of the invention may be ruthenium, osmium, rhenium or technetium, preferably ruthenium. A minor amount of the catalyst is used, e.g., 0.001–5 weight percent, preferably 0.001–2 percent calculated as the metal and based on the reaction medium. The metal may be added as a salt, complex or oxide such as a halide (chloride, bromide, iodide, or fluoride), oxide, hydroxide, carbonyl, cyanide, hydride, nitrate, sulfate, carbonate, $C_1$–$C_5$ carboxylate, etc., or as an acid. The metal may also be added as a free metal providing the reaction medium includes a complexing agent or anion, such as the aforementioned anions, ammonia, $C_2$–$C_{15}$ alkylene diamine, e.g., ethylene diamine, propylene diamine, butylene diamine, nonylene diamine, etc., or $C_1$–$C_5$ primary or secondary alkyl amine, carbon monoxide, a halogen, hydrogen, or a biphyllic ligand as will be described hereinafter. Preferably, the catalyst is added as a halide; preferably chloride. Suitable sources of the metal catalyst include ruthenium tetrachloride, ruthenium trichloride, ruthenium cyanide, ruthenium pentacarbonyl, ruthenium carbonyl hydride, ruthenium nitrate, ruthenium hydroxide, ruthenium sulfide, tetraaminorutheniumhydroxychloro chloride, ruthenium acetate, ruthenium benzoate, osmium dichloride, osmium iodide, osmium oxide, osmium nitrate, osmium sulfite, chloroosmic acid, osmium valerate, osmium sulfate, tetraaminoosmiumhydroxy chloride, ruthenium bromide, rhenium pentacarbonyl, rhenium chloride, rhenium dioxide, rhenium heptoxide, rhenium sulfide, trimethylrhenium, dipyridyl perrhenate, technetium chloride, technetium nitrate, technetium oxide, etc. The particular method by which the metal is added to the reaction medium is not the essence of the invention nor particularly critical to the reaction.

The process is preferably conducted in the presence of a biphyllic ligand which forms a complex with and stabilizes the aforementioned catalyst. Use of a biphyllic ligand is, however, not essential to the process. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands are well known in the art and can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

$$E(R)_3$$

wherein E is trivalent phosphorus, arsenic antimony or bismuth; and wherein R is the same or different alkyl having 1 to about 10 carbons, cycloalkyl having 4 to about 10 carbons and/or aryl having 6 to about 10 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc., and, most preferably, the ligand is triaryl.

Examples of suitable biphyllic ligands having the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)phosphine, ethyldiphenylphosphine, phenylditolylphosphine, phenyldiisopropylphosphine, phenyldiamylphosphine, xylyldiphenylarsine, tolyldi(m-xylyl) stibine, trixylylphosphine, trixylylarsine, trixylylstibine, cyclopentyldixylylstibine, dioctylphenylphosphine, tridurylphosphine, tricumenylphosphine, trixylylbismuthine, etc. Of the aforementioned, the mono-, di- and tri- aryl phosphines, particularly the triarylphosphines (e.g., triphenylphosphine), are preferred because of their greater activity.

The catalyst may be complexed with the above-described biphyllic ligand before being introduced into the reaction medium or the complex may be formed "in situ" by simply adding the metal and the biphyllic ligand directly into the reaction medium. In either case, it is generally preferable that the quantity of biphyllic ligand be in excess, e.g., 10–300% of that stoichiometrically required to form a complex with the metal and is generally 0.01–10 weight percent of the reaction medium. The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutylrate, valerate, etc.), halide, etc. may be but need not be included in the complex catalyst of this invention. These components may be incorporated in the catalyst by the formation of the catalyst complex from a metal salt of the indicated anions. A preferred complex is one comprising at least one halide ligand, e.g., acetate, propionate, butyrate, benzoate, etc., since these groups, particularly the halides, improve the activity of the catalyst. Ammonia or the amine reactant and/or product can also be a ligand in association with the metal catalyst, alone or with one or more of the aforementioned biphyllic ligands.

The process is preferably conducted in the presence of 0.01–10 weight percent, preferably 0.01–5 percent of a strong base such as the alkali or alkaline earth metal hydroxides, e.g., sodium hydroxide, potassium hydroxide, lithium hydroxide, calcium hydroxide, magnesium hydroxide, etc. Since the nitrogen containing reactant and the product are alkaline, the addition of further alkaline agents is not essential to operability but is only preferred for maximum activity.

The reaction is performed under liquid phase conditions. When the reactants and/or product are liquids under the reaction conditions, they can form the desired liquid phase and be diluted, if desired, with a suitable inert organic liquid, preferably a liquid which is a solvent for the reactants and catalyst. Suitable liquids include the saturated and aromatic hydrocarbons which are exemplified by hexane, heptane, octane, benzene, toluene, cyclohexane, cyclodecane, etc.

The liquid phase can also be formed simply by use of an excess of the reactant amine and/or alcohol if a liquid, e.g., 2–100 times that stoichiometrically required for the reaction. This can be accomplished by use of an excess of one of the two reactants, e.g., excess alcohol or excess amine. Alternatively the reactants can be used in stoichiometric proportions and the reaction is discontinued before complete consumption of these reactants. In the process where ammonia is reacted, the reaction medium may be an excess of the reactant alcohol.

The process may be conducted at mild conditions such as temperatures of 50°–400° C., preferably 80°–250° C. and pressures of 1–200 atmospheres absolute, preferably 1–30 atmospheres and sufficient to maintain liquid phase conditions. The desired pressure may be maintained by adding an inert gas, e.g., nitrogen, to the reaction mixture, however, addition of an inert gas is generally not required.

The reaction can be performed batchwise or in a continuous fashion. When operating batchwise, the catalyst, reaction medium and the primary or secondary amine, if a liquid, and the strong base, if utilized, can be introduced in the reaction zone to form a liquid phase therein. The reaction zone can be heated to the desired reaction temperature by preheating the liquid so introduced or by use of heating means in the reactor. In the case where ammonia or a gaseous amine is a reactant or where an inert gas is utilized, the gaseous reactant or inert gas can be introduced to maintain the desired reaction pressure. When performing the reaction in a continuous fashion, the liquid components can be continuously charged to the reaction zone to maintain a liquid phase therein and the ammonia, amine and alcohol reactants can be continuously introduced into the reaction zone to contact the reaction medium containing the catalyst. To enhance the mixing of the reactants, the gaseous reactants can be bubbled directly into the liquid phase and/or liquid phase can be thoroughly agitated by suitable mixers.

The products, i.e., the primary, secondary, or tertiary amine can be recovered from the reaction zone by periodically or continuously withdrawing at least a portion of the liquid reaction medium and the amines may be recovered therefrom by conventional separation processing such as distillation. The remainder of the reaction medium may be recycled to the reaction zone. Unreacted gaseous reactant and/or the inert gas, if utilized, may be taken overhead and recycled to the reaction zone. Mixtures of primary, secondary and tertiary amine products may be formed depending on the reactants and process conditions and these may be separated by conventional processing such as distillation.

Example 1

The following examples illustrate the invention and demonstrate the results actually obtained:

To a 250 milliliter flask equipped with a Dean-Stark tube were added ½ gram ruthenium trichloride, 3 grams triphenylphosphine, 75 milliliters butanol and 75 milliliters dibutylamine. The flask was heated to and maintained at reflux temperature (about 150° C.) for 2 hours while removing the water that distilled from the flask. The liquid contents were analyzed to reveal that 66 grams of tributylamine were formed in the process.

To the flask were added ½ gram ruthenium trichloride, 3 grams triphenylphosphine, 100 milliliters hexanol and 5 milliliters dibutylamine. The reaction medium was heated to and maintained at reflux temperature (about 150° C.) for 7 hours while hydrogen was bubbled into the reaction medium. The liquid contents were analyzed to reveal that 4 grams of dibutylhexylamine were formed in the process.

Example 2

The following example demonstrates comparable results obtained in the absence of and the presence of the invention.

To a 250 milliliter flask equipped with a Dean-Stark tube were added 60 milliliters butanol and 70 milliliters dibutylamine. The flask was heated to and maintained at reflux temperatures for 4 hours. No water was distilled in the process indicating that no condensation reaction occurred.

To the flask was added ½ gram ruthenium trichloride and the flask was again heated to and maintained at reflux. It was observed that water was distilled and tributylamine was formed.

Example 3

The following example illustrates other modes of practice presently contemplated.

To an autoclave are added 200 milliliters of dodecylamine, and 300 milliliters nonadecanol, 1 gram osmium nitrate and 14 grams of tributylarsine. The flask is pressured with nitrogen to 10 atmospheres and heated to and maintained at 175° C. for 4 hours. The liquid contents are removed and dodecylnonadecylamine recovered by distillation.

To an autoclave are added 200 milliliters of diphenylamine, 400 milliliters cyclohexanol, and 2 grams ruthenium nitrate. The autoclave is pressured with nitrogen to 10 atmospheres and heated to and maintained at 200° C. for 2 hours. The liquid contents are removed and diphenylcyclohexylamine is recovered by distillation.

To an autoclave are added 200 milliliters 2-phenylethanol, 1 gram ruthenium tribromide and 10 grams triphenylphosphine. The autoclave is pressured with ammonia to 20 atmospheres and heated to and maintained at 150° C. for 4 hours. The liquid contents are removed and 2-phenylethylamine recovered by distillation.

To an autoclave are added 200 milliliters octanol, 200 milliliters didecylamine, and 1 gram osmium oxide. The autoclave is pressured with nitrogen to 10 atmospheres and heated to and maintained at 250° C. for 10 hours. The liquid contents are removed and didecyloctylamine recovered by distillation.

To an autoclave are added 150 milliliters cyclohexanol, 200 milliliters diphenylamine and 10 grams ruthenium pentacarbonyl. The autoclave is heated to and maintained at 250° C. for 10 hours. The liquid contents are removed and diphenylcyclohexylamine recovered by distillation.

It is apparent that other amines, alcohols, catalysts and biphyllic ligands may be substituted for those described herein without departing from the illustrated mode of practice.

I claim:

1. A process for the preparation of an amine by reacting a nitrogen-containing reactant having 1 to 20 carbons and having the formula:

$$(R)_2NH$$

wherein R is hydrogen or the same or different alkyl group with an alkanol having 1 to 20 carbons in a liquid reaction medium containing 0.001–5 weight percent of a complex of ruthenium or osmium with a biphyllic ligand having a structure:

$$E(R')_3$$

wherein E is trivalent phosphorus or arsenic, and
wherein R' is the same or different alkyl having 1 to 10 carbons, cycloalkyl having 4 to 10 carbons or aryl having 6 to 10 carbons; at a temperature of 50°–400° C. and a pressure of 1–200 atmospheres, sufficient to maintain liquid phase reaction conditions.

2. The process of claim 1 wherein the complex is of ruthenium.

3. The process of claim 1 wherein the complex is ruthenium with an aryl phosphine.

4. The process of claim 1 wherein said amine is an alkyl amine and said alcohol is an alkanol.

5. The process of claim 4 wherein a secondary amine is reacted with an alcohol to form a tertiary amine.

6. The process of claim 4 wherein said amine and alcohol have 1 to 15 carbons.

7. The process of claim 4 wherein said complex is of ruthenium.

8. The process of claim 3 wherein said aryl phosphine is a triaryl phosphine.

9. The process of claim 8 wherein said triaryl phosphine is triphenyl phosphine.

References Cited

UNITED STATES PATENTS

| | | | |
|---|---|---|---|
| 3,223,734 | 12/1965 | Fallstad et al. | 260—583 R |
| 3,513,200 | 5/1970 | Biale | 260—583 B |
| 2,497,310 | 2/1950 | Larson | 260—583 R |

FOREIGN PATENTS

| | | | |
|---|---|---|---|
| 747,841 | 4/1956 | Great Britain | 260—583 P |

LEWIS GOTTS, Primary Examiner

C. F. WARREN, Assistant Examiner

U.S. Cl. X.R.

260—563 R, 563 C, 570.5, 570.9, 576, 577, 583 R